United States Patent
Kriegel

(10) Patent No.: US 12,393,178 B2
(45) Date of Patent: Aug. 19, 2025

(54) METHOD AND DEVICE FOR MANAGING LICENSES IN AN INDUSTRIAL AUTOMATION SYSTEM

(71) Applicant: TURCK HOLDING GMBH, Halver (DE)

(72) Inventor: Thomas Kriegel, Lüdenscheid (DE)

(73) Assignee: Turck Holding GmbH, Halver (DE)

( * ) Notice: Subject to any disclaimer, the term of this patent is extended or adjusted under 35 U.S.C. 154(b) by 460 days.

(21) Appl. No.: 18/048,930

(22) Filed: Oct. 24, 2022

(65) Prior Publication Data

US 2023/0229145 A1  Jul. 20, 2023

(30) Foreign Application Priority Data

Jan. 14, 2022 (DE) .................... 10 2022 100 794.4

(51) Int. Cl.
*G05B 19/418* (2006.01)
*G06F 21/10* (2013.01)

(52) U.S. Cl.
CPC ......... *G05B 19/4186* (2013.01); *G06F 21/10* (2013.01); *G05B 2219/1134* (2013.01); *G05B 2219/24165* (2013.01)

(58) Field of Classification Search
CPC ........ G05B 19/4186; G05B 2219/1134; G05B 2219/24165; G06F 21/10
USPC ........................................................ 700/306
See application file for complete search history.

(56) References Cited

U.S. PATENT DOCUMENTS

| 6,816,842 B1 * | 11/2004 | Singh .................... G06F 21/105 |
| | | 705/59 |
| 2010/0083232 A1 * | 4/2010 | Chouinard .......... G06F 11/3648 |
| | | 717/124 |
| 2014/0283133 A1 | 9/2014 | Rodriguez et al. |
| 2017/0076073 A1 | 3/2017 | Abe et al. |
| 2018/0027071 A1 | 1/2018 | Toepke et al. |
| 2021/0091930 A1 * | 3/2021 | Visoky ................. G06F 21/629 |

(Continued)

OTHER PUBLICATIONS

European Search Report issued in EP 22 212 894.4, which is a counterpart hereof, mailed Jun. 7, 2023, and english machine translation thereof.

*Primary Examiner* — Md Azad
(74) *Attorney, Agent, or Firm* — Tautz & Schuhmacher LLC; Michael McCandlish; Georg Hasselmann

(57) ABSTRACT

A method for managing functionality licenses in a closed network is disclosed, wherein at least one subscriber device is connected to the closed network. The method includes operating a server having a license database, wherein the license database includes a plurality of functionality licenses and each functionality license includes a functionality identifier. When the server receives a license request from the at least one subscriber device, the license request including a further functionality identifier, the server compares the further functionality identifier to the functionality identifiers in the license database and assigns a functionality license of the database, which includes a functionality identifier that matches the further functionality identifier to the subscriber device from which the license request was received. Assigning entails storing of the at least one subscriber device from which the license request was received at the server as a licensed subscriber device in the license database.

11 Claims, 3 Drawing Sheets

(56) References Cited

U.S. PATENT DOCUMENTS

| | | |
|---|---|---|
| 2021/0390645 A1 | 12/2021 | Kohlstrom |
| 2023/0206371 A1* | 6/2023 | Seidlitz .................. G06F 21/10 |
| | | 705/320 |

* cited by examiner

METHOD AND DEVICE FOR MANAGING LICENSES IN AN INDUSTRIAL AUTOMATION SYSTEM

CROSS REFERENCE TO RELATED APPLICATIONS

This application claims priority to German patent application DE 10 2022 100 794.4 filed on Jan. 14, 2022, which is hereby incorporated by reference in its entirety.

TECHNICAL AREA

This disclosure relates to an industrial automation system comprising a closed network, e.g., a fieldbus, and subscriber devices connected thereto.

BACKGROUND

In industrial automation, various devices, such as programmable logic controllers (PLCs), control and monitoring terminals, and automation devices that monitor and control industrial operations, are often interconnected via a fieldbus to ensure fast communication and thus improved automation. In addition to this connection with or via the fieldbus, the devices may be able to interact, e.g., with sensors and actuators at the field level to monitor and control industrial operations. For this purpose, input/output modules (I/O modules) can be integrated into the fieldbus, which are connected to the fieldbus, e.g., directly or indirectly, i.e., via a device such as a gateway. Due to the numerous possible sensors and actuators, these I/O modules may be capable of comprising diverse I/O configurations and/or carrying out diverse functionalities. I/O modules can also be capable of carrying out various logic functions, depending on which input or output the I/O module should process. Also, the other devices coupled to the fieldbus may be capable of carrying out different logic functions. Due to the numerous possible I/O as well as logic capabilities in industrial automation, functionality licenses may not be available for all possible I/O as well as logic capabilities in an industrial automation system. In addition, a fieldbus may be decoupled from external networks for security reasons or may be only sporadically connected to them. An addition of functionality licenses in an industrial automation system can therefore only be possible to a limited extent, which means that only a certain quantity of functionality licenses can be present in the industrial automation system. Against this background, there is a need to manage licenses in an industrial automation system with respect to the certain quantity on the one hand and the desired functionalities of the I/O modules and devices of the industrial automation system on the other hand.

SUMMARY

One object of the disclosure may be formulated to provide a device and/or a method being suitable to enrich the state of the art.

According to an exemplary embodiment, this object is solved by a method for managing functionality licenses in a closed network in which at least one subscriber device is connected to the closed network. The method comprises operating a server including a license database, wherein the license database includes a plurality of the functionality licenses, wherein each functionality license of the plurality of the functionality licenses includes a functionality identifier. The method comprises receiving a license request at the server from the at least one subscriber device, wherein the license request includes a further functionality identifier. The method comprises comparing the further functionality identifier to the functionality identifiers in the license database. The method comprises assigning a functionality license of the database which comprises a functionality identifier that matches to the further functionality identifier to the subscriber device from which the license request was received at the server. The assigning includes storing of the at least one subscriber device from which the license request was received at the server as a licensed subscriber device in the license database.

The closed network can be any network suitable for an industrial automation system, such as PROFIBUS-DP, DeviceNET, CANopen, Modbus TCP, EtherNet/IP, EtherCAT and PROFINET. In addition, the closed network can be wireless as well as wired, as long as the requirements, especially in terms of security, for an industrial automation system network are met. A closed network may be a network that is at least partly and/or during certain timespans decoupled from (a) public network(s), such as the internet. This may be done at least to the extent that the security requirements for a network of an industrial automation system are satisfied. In some cases, this may mean that no subscriber device of the closed network is connected to any other network, especially the public network. In some cases, this may mean that one or more specially secured subscriber devices can access a separate or further network, at least sporadically, as long as they can prevent direct access from the separate network to the closed network via themselves. This decoupling of the closed network from separate networks increases the security of the industrial automation system.

Subscriber devices can be any conceivable device that can be connected to a closed network in an industrial automation system. For example, these may be PLCs, monitoring terminals, automation devices, or gateways, wherein the gateways establish a connection to sensors and actuators of the field level via I/O modules. Additionally or alternatively, both, the I/O modules, and the sensors and actuators, may also be connected directly to the closed network.

According to the method a license database may be operated, wherein the license database may comprise a plurality of functionality licenses, each functionality license comprising a functionality identifier. The license database may be any suitable database capable of storing, deleting, and modifying functionality licenses. Each functionality license in the license database comprises at least one functionality identifier, which may be, e.g., a numeric or alphanumeric identifier with a fixed-length or variable-length. The functionality identifier may specify at least one logic function and/or at least one an I/O function that is/are available for use by participation devices of the closed network for licensing. The functionality identifier may also specify a combination of I/O and logic functions. In addition, each functionality license may comprise further information, depending on the needs of the particular industrial automation system. Consequently, the license database may be any database that can store, delete, and/or modify such information. The license database may be stored on a dedicated license server connected to the closed network. Alternatively, the license database may be stored on a subscriber device of the closed network that also undertakes other tasks in the closed network. Alternatively, the license database may be stored on the PLC of the closed network if one is provided in the closed network. By storing the license database in the closed network, the industrial automation system can manage the functionality licenses without requiring access to other networks that could compromise the security of the industrial automation system.

The license database may receive the license request from the subscriber device connected to the closed network. As described above, the license request comprises the functionality identifier that is then compared to the functionality identifier of the plurality of functionality licenses. The functionality identifier of the license request may thereby be substantially the same as the functionality identifier of the functionality licenses in the license database.

As explained above, if the functionality identifier of the functionality license among the plurality of device licenses matches the functionality identifier of the license request, the functionality license corresponding to the license request is assigned to the subscriber device, wherein the assigning comprises storing the subscriber device as a licensed subscriber device in the license database. In doing so, the license database may store, e.g., a subscriber device identifier in the entry of the functionality license that uniquely identifies the subscriber device. The subscriber device identifier may be, e.g., a MAC address or an IP address or any other unique identifier used to identify subscriber devices according to the protocol used for the closed network.

According to an exemplary embodiment, the method may further comprise scanning the closed network to verify if the at least one subscriber device from which the license request was received at the server is still connected to the closed network. The method may further comprise, if the scanning yields that the at least one subscriber device from which the license request was received at the server is no longer connected to the closed network, deleting the at least one subscriber device from which the license request was received at the server as the licensed subscriber device from the license database.

The scanning for a licensed subscriber device can be performed by the device on which the license database is stored, e.g., attempting to contact the licensed subscriber device. This may be done, e.g., using the subscriber device identifier that has been stored in the license database in the entry of the functionality license that has been assigned to the subscriber device. If the subscriber device cannot be contacted, the subscriber device may be deleted as a licensed subscriber device so that the functionality license may be again available in the closed network. In doing so, to avoid erroneous deletion, the subscriber device may be deleted as a licensed subscriber device, e.g., only after a certain number of contact attempts have failed or after a certain amount of time has elapsed on the contact attempt. Deletion of the subscriber device as a licensed subscriber device may be accomplished, e.g., by deleting the subscriber device identifier in the entry for the subscriber device assigned to it or otherwise indicating in the entry for the functionality license that the license may be reassigned.

According to an exemplary embodiment, the method may further comprise querying the at least one subscriber device to determine functionality licenses assigned in the closed network, comparing the functionality licenses assigned in the closed network with the plurality of functionality licenses in the license database to determine if at least one of the queried functionality licenses is not in the license database, and adding the determined at least one of the queried functionality licenses that is not in the license database to the license database.

For example, the device on which the license database is stored may contact all subscriber devices connected to the closed network. This may be done, e.g., via a broadcast signal or any other manner possible under the protocol used for the closed network to contact all subscriber devices. In response to this contacting, the subscriber devices may respond with the functionality licenses assigned to them. These functionality licenses may be matched with the functionality licenses of the plurality of functionality licenses. This matching may comprise a comparison of the respective type of functionality license across the functionality identifier and counting the respective number of the type of functionality license found in the closed network. If the matching determines that a functionality license assigned in the closed network is not comprised in or is not part of the plurality of functionality licenses, the respective assigned functionality license may be added to the plurality of functionality licenses in the license database. For example, if the matching between the functionality licenses assigned in the closed network and the plurality of functionality licenses indicates that there are five licenses of type "x" of a functionality license in the closed network, but the license database contains only three of type "x," two functionality licenses of that type may be added to the license database. By the querying, matching, and adding, functionality licenses can be added to the license database by, e.g., new subscriber devices added to the closed network. If, e.g., the industrial automation system is expanded by additional subscriber devices that are provided with pre-assigned functionality licenses, the license database can be expanded at the same time. This means that the license database can be expanded without having to establish a connection between the license server and an external license server that might compromise the security of the closed network.

Further, according to an exemplary embodiment, the method may further comprise returning the assigned functionality license to the server by the at least one subscriber device, and in response to receiving the returned assigned functionality license at the server, deleting the subscriber device as the licensed subscriber device from the license database. This may be done, e.g., by the subscriber device sending a message to the device on which the license database is stored that it no longer needs the functionality license. In response to the return, the license database may delete the subscriber device as licensed subscriber device. The deletion can be done, e.g., as described above following the step of scanning.

According to an exemplary embodiment, the method may further comprise sending an error message from the server to the at least one subscriber device from which the license request was received at the server, if no functionality identifier in the license database matches the further functionality identifier. This error message may be issued according to the protocol used by the closed network, e.g., from the device on which the license database is stored via the closed network.

According to an exemplary embodiment, the method may further comprise contacting an external license database via a network separate from the closed network to add a functionality license to the license database if no functionality identifier in the license database matches the further functionality identifier, wherein the added functionality license includes a functionality identifier that matches the further functionality identifier. The separate network may be the Internet or may be another network of a facility where the industrial automation system is located. A secure connection may mean a protected or encrypted connection using, e.g., TLS or DTLS or other protocols to secure the connection to the external license database. By contacting an external license database, the license database can be expanded to comprise functionality licenses that might otherwise be missing for the desired functionality of the industrial automation system.

According to an exemplary embodiment, one, some or all of the functionality licenses may include a device class identifier and/or a licensee identifier. The device class identifier may indicate which class of subscriber device a particular functionality license is intended for. The licensee identifier may identify the facility that owns the licenses and may be used, e.g., when the license database communicates with an external database to add functionality licenses that are not operated by the industrial automation system facility.

According to an exemplary embodiment, one, some or all of the functionality licenses may include a licensed parameterization of the at least one subscriber device, and wherein the further functionality identifier includes a parameterization that has been assigned to the at least one subscriber device by a programmable logic controller of the closed network. In this case, the parameterization comprises a parameter set that defines functions of a subscriber device that are licensed. The functionality identifier of the license request may comprise a parameterization that has been assigned to the subscriber device by a PLC of the closed network. In some industrial automation systems, a PLC may assign a parameterization, i.e., a set of parameters defining functions of a subscriber device, to a subscriber device. The subscriber device can then forward this parameterization as a license request to the database to obtain a license for the parameterization assigned by the PLC.

According to an exemplary embodiment, the functionality identifier may indicate a logic function of a subscriber device and/or a function of an I/O interface of the at least one subscriber device. A logic function may comprise, e.g., the handling of a measurement value, such as comparing the measurement value to a threshold value or converting the measurement value to a specific logic value based on a predefined logic function. A function of an I/O interface may, e.g., comprise whether the inputs and outputs are to be used as analog or digital inputs and outputs. Further, a function of an I/O interface may comprise whether the inputs and outputs receive a voltage signal or a current signal and at what level. A function of an I/O interface may further comprise with which type of sensor the inputs and outputs are coupled, e.g., platinum sensors, nickel sensors, thermocouples, or resistors.

According to an exemplary embodiment, the method may further comprise initializing the license database by querying the at least one subscriber device to determine the functionality licenses assigned in the closed network, and adding the functionality licenses assigned in the closed network to the license database. Both steps may be substantially the same as the query and add steps discussed earlier. In the context of initialization, these steps may be used to add the functionality licenses present in the closed network to the license database. This can be done, e.g., when initializing the license database for the first time after starting the industrial automation system. This can also be done after a restart of the license database, e.g., because of a power failure or another error of the license database and/or the industrial automation system. In such an error case, the querying and adding allow a quick recovery of the industrial automation system without having to establish an unsecure connection with a separate network.

According to an exemplary embodiment, the method may further comprise initializing the license database by contacting an external license database over a network separate from the closed network, such that the plurality of functionality licenses is transferred from the external license database to the license database. The step of contacting may be substantially the same as the step of contacting discussed previously. The initializing of the license database via the external database allows all functionality licenses available for operation to be entered into license database. This can happen e.g., once during commissioning of the industrial automation system or in regular intervals in the form of updating the inventory of functionality licenses of the operation. Furthermore, this can be done, e.g., after a failure of the license database and/or the industrial automation system.

Further, according to an exemplary embodiment, the object is solved by a device comprising at least one communication interface coupled to a closed network, a memory configured to store a license database and program instructions performing the above described method at least partly, and a processor configured to execute the program instructions stored in the memory.

More specifically, the preceding method steps may be performed, if not already indicated, according to an exemplary embodiment by a device. This device comprises at least one communication interface, wherein the at least one communication interface is adapted to be coupled to a closed network. In this regard, the communication interface may be any communication interface suitable for connection to a closed network according to the type of closed network used. For example, the communication interface may be an Ethernet port in the case of a wired closed network or a WiFi interface in the case of a wireless closed network. The device further comprises a memory adapted to store a license database and program instructions to perform the method steps discussed above. The memory may comprise any form of non-volatile memory, such as a hard disk or NAND flash. Finally, the device comprises a processor adapted to execute the program instructions stored in the memory. In this regard, the processor may be any common type of processor, such as. e.g., an X86 or AMD86-based processor, an ARM-based processor, or a RISC-V-based processor.

BRIEF DESCRIPTION OF THE FIGURES

The drawings accompanying this description serve to illustrate the exemplary embodiments of this disclosure, with identical reference signs referring to identical or similar components.

DETAILED DESCRIPTION

With reference to the accompanying drawings, the following detailed description describes exemplary embodiments illustrating a method and a device for managing functionality licenses in an industrial automation system. The exemplary embodiments are not intended to limit the subject matter of the present disclosure to the embodiments described herein. Rather, these exemplary embodiments serve to illustrate the subject matter of the present disclosure and may be modified and combined within the scope of the present disclosure. Modifying the exemplary embodiments may comprise omitting features that are not absolutely necessary.

Figure 1:
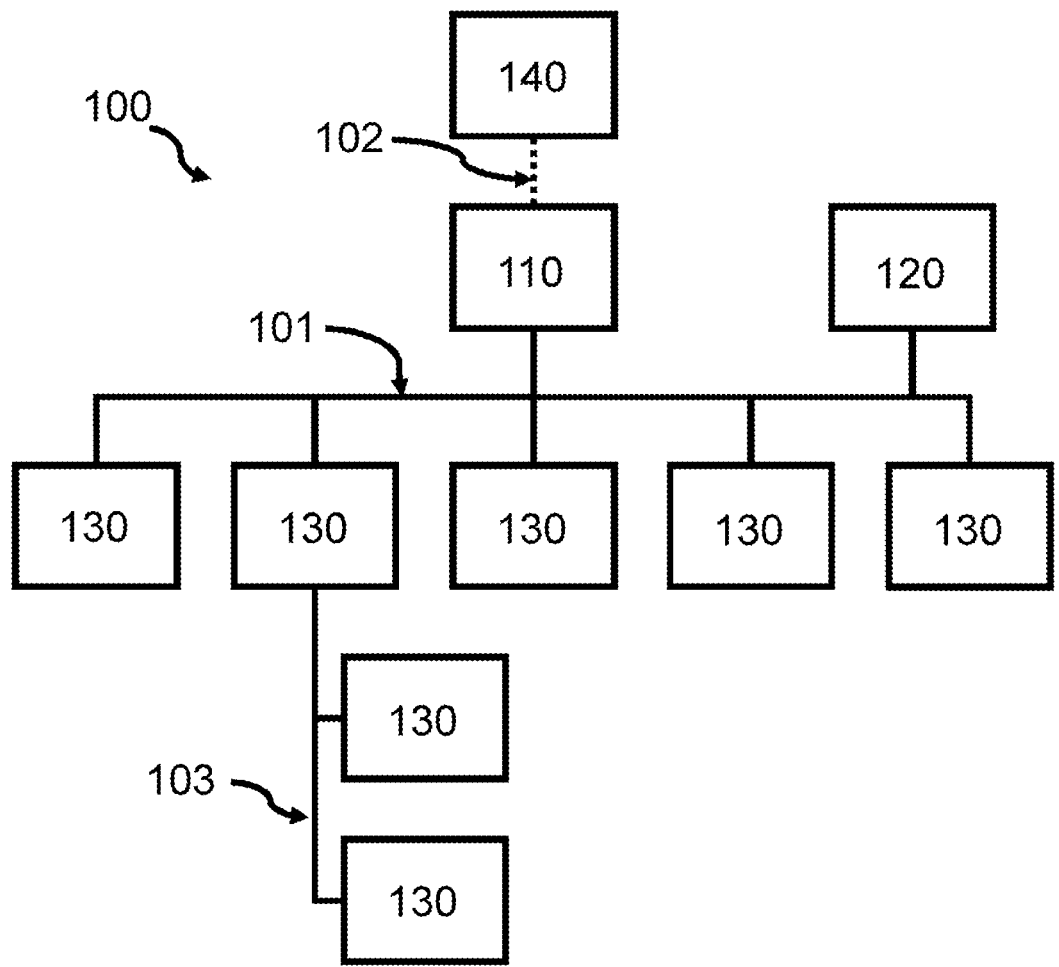
FIG. 1 shows a block diagram of an industrial automation system according to an exemplary embodiment.

FIG. 1 illustrates an exemplary industrial automation system 100 that comprises a closed network 101 to which a license server 110, a PLC 120, and a plurality of subscriber devices 130 are coupled. The license server 110 is also optionally coupled to an external license database 140 via a separate network 102. The license server 110 is shown here as a stand-alone device but may also be part of at least one of the subscriber devices 130 or the PLC 120. Similarly, the PLC 120 is shown in FIG. 1 as a stand-alone device but may be part of at least one of the subscriber devices 130.

The industrial automation system 100 may further comprise a module network 103 connected to the closed network 101 via at least one of the subscriber devices 130 configured as a gateway. The subscriber devices 130 connected to the module network 103 may be I/O modules connected to (not shown) sensors and actuators in the field level. The I/O modules may alternatively or additionally be directly connected to the closed network 101. For example, some of the subscriber devices 130 directly connected to the closed network 101 may be I/O modules. The module network 103 may use the same protocol as the closed network 101 or may use a different protocol than the closed network 101. The module network 103 may be wireless or wired. The term protocol as used in this disclosure may mean a communication protocol.

Figure 2:
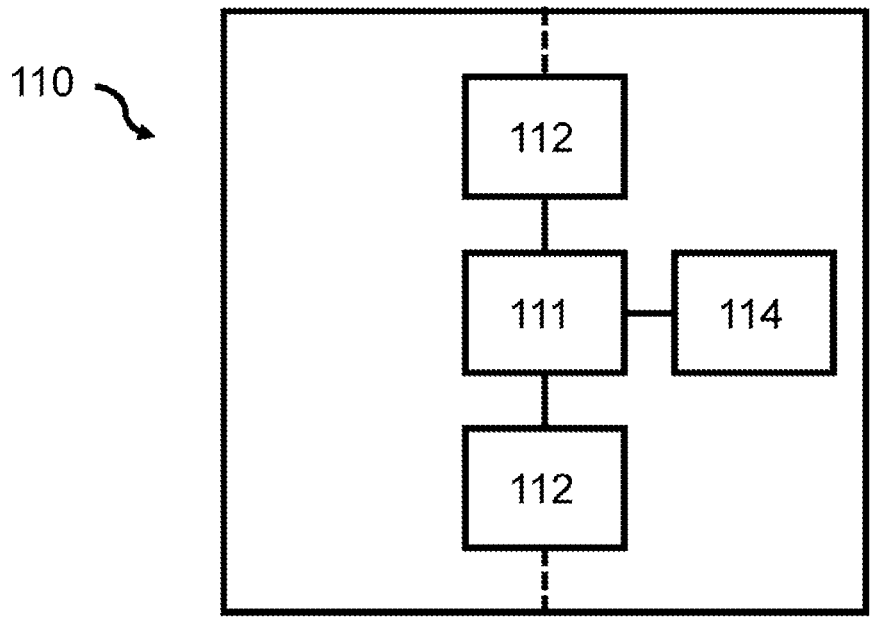
FIG. 2 shows a block diagram of a license server capable of executing a functionality license managing method according to an exemplary embodiment.

FIG. 2 shows an example for the license server 110 that comprises a processor 111, two communication interfaces 112, and a memory 114. The solid connections represent internal connections of the license server 110. The dashed connections represent connections to external networks. The license server 110 may store in its memory 114 the previously discussed license database and program instructions for executing the exemplary embodiments of the method for managing functionality licenses.

The license server 110 of FIG. 2 comprises the two communication interfaces 112 in a manner similar to the illustration of the license server 110 in FIG. 1. The license server 110 is shown as being connected to the closed network 101 and the separate network 102. In FIG. 2, the license server 110 has separate communication interfaces 112 for these two connections. Alternatively, the connection to both networks 101, 102 may be made via one communication interface 112. Alternatively, the license server 110 may be connected exclusively to the closed network 101. Via the communication interface 112, the license server 110 may, e.g., receive license requests, scan for licensed subscriber devices, assign capability licenses, receive functionality license return messages, and communicate with the external database to add a functionality license or initialize the license database.

Figure 3:
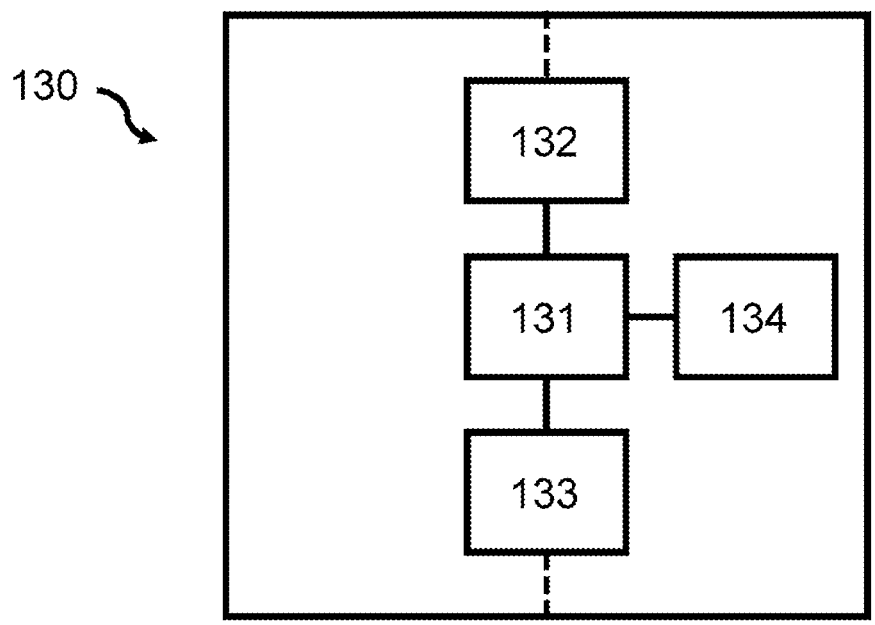
FIG. 3 shows a block diagram of a subscriber device according to an exemplary embodiment.

FIG. 3 shows an example for the subscriber device 130 that comprises a processor 131, a communication interface 132, an I/O interface 133, and a memory 134. The solid connections represent internal connections of the subscriber device 130. The dashed connections represent connections to the closed network 101 and to the sensors and actuators in the field layer. The processor 131 may be adapted to perform logic functionality for which functionality licenses may be required. The I/O interface 133 may be set up to perform various I/O functionalities that may also require functionality licenses. License requests for required functionality licenses may be sent by the subscriber device 130 via the communication interface 132. The license assigned in response to the license request from the license server 110 may be stored by the subscriber device in the memory 134.

With the exception of the I/O interface 133, the components of the subscriber device 130 correspond to those of the license server 110. Accordingly, the license server 110 may also be implemented on the subscriber device 130.

Figure 4:
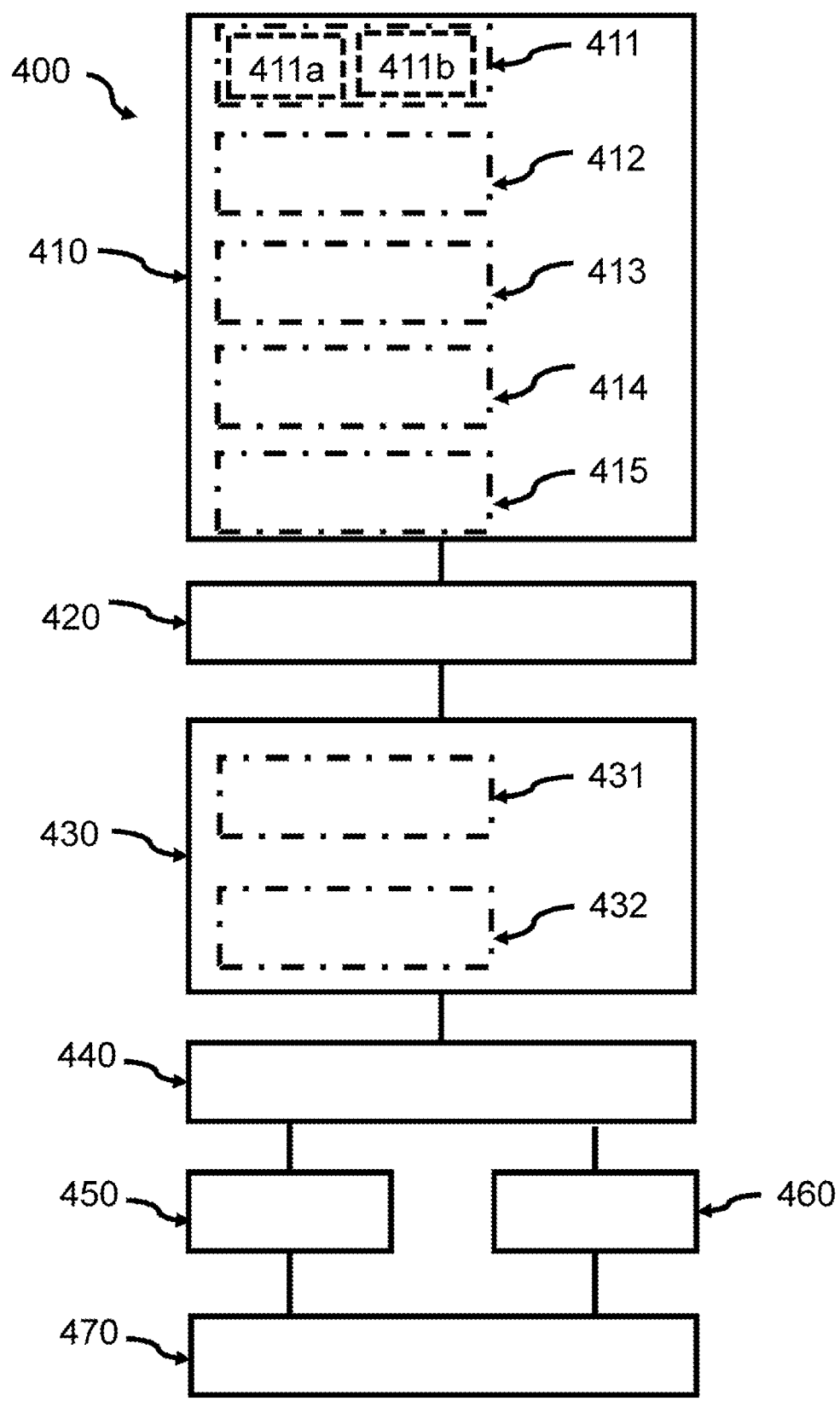
FIG. 4 shows a flowchart of a method for managing functionality licenses according to an exemplary embodiment.

FIG. 4 illustrates an exemplary method 400 for managing functionality licenses in the closed network 101 of FIG. 1.

In step 410, the method operates the license database, wherein the license database comprises after initializing a plurality of functionality licenses, wherein each functionality license comprises a functionality identifier.

The step 410 may comprise a step 411 of initializing the license database by querying the subscriber devices 130 by the license server 110 to determine functionality licenses assigned in the closed network 101 in a step 411a. In a step 411b the functionality licenses determined in the step 411a are stored in the license database, e.g., are added to a plurality of functionality licenses already stored in the license database.

The step 410 may comprise a step 412 of initializing the license database by having the license server 110 contact the external license database 140 via a secure connection via the separate network 102 being separate from the closed network 101, wherein a plurality of functionality licenses stored in the external database 140 is transferred from the external database 140 to the license database.

The step 410 may comprise a step 413 of querying the subscriber devices 130 to determine the functionality licenses assigned in the closed network 101.

The so determined assigned functionality licenses are matched with the plurality of functionality licenses stored in the license database in step 414 which is part of the step 410.

If the matching in step 414 determines that a functionality license assigned in the closed network 101 is not comprised in the plurality of functionality licenses stored in the license database, the assigned functionality licenses not already stored in the license database are added to the plurality of functionality licenses stored in the license database in a step 415.

In step 420, the license server 110 receives a license request from at least one of the subscriber devices 130 connected to the closed network 101, the license request comprising a functionality identifier.

In step 430, the license server 110 compares the functionality identifier of the license request with the functionality identifier of the plurality of functionality licenses stored in the license database.

The step 430 may comprise a step 431 in which the license server 110 sends an error message to the subscriber device 130 from which the request was received if no functionality identifier of a functionality license of the plurality of device licenses stored in the license database matches the functionality identifier of the license request.

Additionally or alternatively, the step 430 may comprise a step 432 in which the license server 110 contacts the external license database 140 via the secure connection via the separate network 102 to add a functionality license corresponding to the functionality identifier of the license request to the plurality of functionality licenses stored in the license database. The step 432 is carried out when no functionality identifier of a functionality license from the plurality of device licenses stored in the license database corresponds to the functionality identifier of the license request.

In step 440, the license server 110 assigns the functionality license corresponding to the functionality identifier of the license request to the subscriber device 130. The step 440 is carried out when a functionality identifier of a functionality license among the plurality of device licenses stored in the license database corresponds to the functionality identifier of the license request, wherein the assigning comprises storing the subscriber device 130 as a licensed subscriber device in the license database.

In step 450, the license server 110 scans the closed network 101 to verify if the licensed subscriber device 130 is still connected to the closed network 101. If the scanning yields or indicates that the licensed subscriber device 130 is no longer connected to the closed network 101, in step 470 the subscriber device 130 is deleted as a licensed subscriber device 130 from the license database.

In step 460, the subscriber device 130 returns an assigned functionality license to the license database by the subscriber device 130. In response to the return, in step 470, the license server 110 deletes subscriber device 130 as a licensed subscriber device 130.

CLAUSES

1. Method (400) for managing functionality licenses in a closed network (101), wherein a plurality of subscriber devices (110, 120, 130) is connected to the closed network (101), comprising:
    operating (410) a license database (110), wherein the license database comprises a plurality of functionality licenses, wherein each functionality license comprises a functionality identifier;
    receiving (420) a license request from the subscriber device (130) connected to the closed network (101), wherein the license request comprises a functionality identifier;
    comparing (430) the functionality identifier of the license request to the functionality identifier of the plurality of functionality licenses; and
    if a functionality identifier of a functionality license among the plurality of device licenses corresponds to the functionality identifier of the license request, assigning (440) the functionality license corresponding to the license request to the subscriber device (130), wherein the assigning comprises storing of the subscriber device (130) as a licensed subscriber device in the license database.
2. Method of clause 1, wherein the method further comprises:
    scanning (450) the closed network to verify if the licensed subscriber device is still connected to the closed network; and
    if the scanning yields that the licensed subscriber device is no longer connected to the closed network, deleting (470) the subscriber device (130) as a licensed subscriber device.
3. Method according to any one of the preceding clauses, wherein the method further comprises:
    querying (413) the plurality of subscriber devices to determine the functionality licenses assigned in the closed network (101);
    matching (414) the functionality licenses assigned in the closed network with the plurality of functionality licenses; and
    if the matching determines that a functionality license assigned in the closed network (101) is not comprised in the plurality of functionality licenses, adding (415) the assigned functionality license to the plurality of functionality licenses.
4. Method according to any one of the preceding clauses, further comprising:
    returning (460) an assigned functionality license to the license database by the subscriber device (130); and
    in response to the returning, deleting (470) the subscriber device (130) as a licensed subscriber device.
5. Method according to any one of the preceding clauses, further comprising:
    if no functionality identifier of a functionality license among the plurality of device licenses matches the functionality identifier of the license request, sending (431) an error message to the subscriber device (110, 120, 130).
6. Method of any one of clauses 1 to 4, further comprising:
    if no functionality identifier of a functionality license among the plurality of device licenses matches the functionality identifier of the license request, contacting (432) an external license database (140) via a secure connection via a network (102) separate from the closed network (101) to add a functionality license matching the functionality identifier of the license request to the plurality of functionality licenses.
7. Method according to any one of the preceding clauses, wherein each functionality license among the plurality of functionality licenses further comprises one or more of a device class identifier and a licensee identifier.
8. Method according to any one of the preceding clauses, wherein the functionality identifier of each functionality license among the plurality of functionality licenses comprises a licensed parameterization of the subscriber device (110, 120, 130), and wherein the functionality identifier of the license request comprises a parameterization that has been assigned to the subscriber device by a programmable logic controller—PLC—(120) of the closed network (101).
9. Method according to any one of the preceding clauses, wherein the functionality identifier indicates one or more of a logic function of a subscriber device (110, 120, 130) and a function of an I/O interface (133) of the subscriber device (110, 120, 130).
10. Method according to any one of the preceding clauses, further comprising:
    initializing (411) the license database by:
    querying (411*a*) the plurality of subscriber devices to determine the functionality licenses assigned in the closed network (101); and
    adding (411*b*) the functionality licenses assigned in the closed network to the plurality of functionality licenses.
11. Method (400) according to any one of the preceding clauses, further comprising:
    initializing (412) the license database (140) by contacting an external license database over a secure connection via a network (102) separate from the closed network (101), wherein the plurality of functionality licenses is transferred from the external database to the license database.
12. Device (110, 120, 130), comprising:
    at least one communication interface (112, 132), wherein the at least one communication interface (112, 132) is adapted to be coupled to a closed network (101);
    a memory (114, 134) adapted to store a license database and program instructions performing the method (400) of any one of clauses 1 to 11; and
    a processor (111, 131) adapted to execute the program instructions stored in the memory.

REFERENCE SIGNS 100 industrial automation system
101 closed network
102 separate network
103 module network
110 license server
111 processor
112 communication interface
114 memory
120 PLC
130 subscriber device
131 processor
132 communication interface
133 I/O interface
134 memory
140 external license database
400 method
410 operating license database
411 initializing license database
411a querying subscriber devices to determine assigned functionality licenses
411b add functionality licenses to license database
412 contact external license database and transfer plurality of functionality licenses from external license database to license database
13 querying subscriber devices to determine assigned functionality licenses
414 matching queried and stored functionality licenses
415 update license database
420 receiving license request at license server from subscriber device
430 compare received functionality identifier with stored functionality identifier
431 send error message in case of functionality identifier mismatch
432 request functionality license from external database in case of functionality identifier mismatch
440 assigning subscriber device to stored license
450 scanning closed network
460 sending assigned functionality license from subscriber device to license database
470 delete subscriber device as licensed subscriber device

The invention claimed is:

1. A method for managing functionality licenses in a closed network of an industrial automation system, wherein the closed network includes a server and at least one subscriber device being connected via the closed network to the server, the at least one subscriber device being configured to establish a connection to a sensor and/or an actuator in a field level, the method comprising:
operating the server including a license database, wherein the license database includes a plurality of the functionality licenses, wherein each functionality license of the plurality of the functionality licenses includes a functionality identifier;
receiving a license request at the server from the at least one subscriber device, wherein the license request includes a further functionality identifier;
comparing the further functionality identifier to the functionality identifiers in the license database; and
assigning a functionality license of the database which comprises a functionality identifier that matches to the further functionality identifier to the subscriber device from which the license request was received at the server,
wherein the assigning includes storing of the at least one subscriber device from which the license request was received at the server as a licensed subscriber device in the license database.

2. The method according to claim 1, further comprising:
scanning the closed network to verify if the at least one subscriber device from which the license request was received at the server is still connected to the closed network; and
if the scanning yields that the at least one subscriber device from which the license request was received at the server is no longer connected to the closed network, deleting the at least one subscriber device from which the license request was received at the server as the licensed subscriber device from the license database.

3. The method according to claim 1, further comprising:
querying the at least one subscriber device to determine functionality licenses assigned in the closed network;
comparing the functionality licenses assigned in the closed network with the plurality of functionality licenses in the license database to determine if at least one of the queried functionality licenses is not in the license database; and
adding the determined at least one of the queried functionality licenses that is not in the license database to the license database.

4. The method according to claim 1, further comprising:
returning the assigned functionality license to the server by the at least one subscriber device; and
in response to receiving the returned assigned functionality license at the server, deleting the subscriber device as the licensed subscriber device from the license database.

5. The method according to claim 1, further comprising:
sending an error message from the server to the at least one subscriber device from which the license request was received at the server, if no functionality identifier in the license database matches the further functionality identifier.

6. The method according to claim 1, further comprising:
contacting an external license database via a network separate from the closed network to add a functionality license to the license database if no functionality identifier in the license database matches the further functionality identifier, wherein the added functionality license includes a functionality identifier that matches the further functionality identifier.

7. The method according to claim 1, wherein:
one, some or all of the functionality licenses include a device class identifier and/or a licensee identifier, and/or
the functionality identifier indicates a logic function of a subscriber device and/or a function of an I/O interface of the at least one subscriber device.

8. The method according to claim 1, wherein one, some or all of the functionality licenses includes a licensed parameterization of the at least one subscriber device, and wherein the further functionality identifier includes a parameterization that has been assigned to the at least one subscriber device by a programmable logic controller of the closed network.

9. The method according to claim 1, further comprising initializing the license database by:
querying the at least one subscriber device to determine the functionality licenses assigned in the closed network; and adding the functionality licenses assigned in the closed network to the license database.

10. The method according to claim 1, further comprising initializing the license database by contacting an external license database over a network separate from the closed network, such that the plurality of functionality licenses is transferred from the external license database to the license database.

11. A device comprising:
- at least one communication interface coupled to a closed network;
- a memory configured to store a license database and program instructions performing the method of claim 1; and
- a processor configured to execute the program instructions stored in the memory.

\* \* \* \* \*